United States Patent
Tsirkin

(10) Patent No.: US 11,556,371 B2
(45) Date of Patent: Jan. 17, 2023

(54) HYPERVISOR TASK EXECUTION MANAGEMENT FOR VIRTUAL MACHINES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 282 days.

(21) Appl. No.: 16/828,345

(22) Filed: Mar. 24, 2020

(65) Prior Publication Data
US 2021/0303324 A1 Sep. 30, 2021

(51) Int. Cl.
G06F 9/455 (2018.01)
G06F 9/48 (2006.01)
G06F 9/30 (2018.01)
G06F 9/54 (2006.01)

(52) U.S. Cl.
CPC ........ *G06F 9/45558* (2013.01); *G06F 9/3009* (2013.01); *G06F 9/4856* (2013.01); *G06F 9/4881* (2013.01); *G06F 9/542* (2013.01); G06F 2009/45579 (2013.01)

(58) Field of Classification Search
None
See application file for complete search history.

(56) References Cited

U.S. PATENT DOCUMENTS

| | | | | |
|---|---|---|---|---|
| 8,612,633 B2* | 12/2013 | Cleeton | ............... | G06F 9/45558 718/1 |
| 9,183,030 B2* | 11/2015 | Nicholas | ............. | G06F 9/45558 |
| 9,489,228 B2* | 11/2016 | Tsirkin | ................ | G06F 9/45558 |
| 9,753,770 B2* | 9/2017 | Gordon | ............... | G06F 9/30098 |
| 9,785,460 B2* | 10/2017 | Zheng | ................ | G06F 9/45558 |
| 9,858,101 B2* | 1/2018 | Tsirkin | ................ | G06F 9/45558 |
| 9,977,690 B2* | 5/2018 | Tsirkin | ................ | G06F 9/45541 |
| 10,055,248 B1* | 8/2018 | Tsirkin | ....................... | G06F 9/48 |
| 10,310,887 B2 | 6/2019 | Tsirkin et al. | | |
| 10,365,936 B2 | 7/2019 | van Riel et al. | | |
| 10,409,633 B2* | 9/2019 | Tsirkin | ................ | G06F 9/45541 |
| 10,452,572 B2 | 10/2019 | Lu et al. | | |
| 10,871,982 B2* | 12/2020 | Tsirkin | ................ | G06F 9/45533 |
| 10,956,193 B2* | 3/2021 | Oks | ......................... | G06F 9/545 |
| 2015/0286501 A1* | 10/2015 | Gordon | ............... | G06F 9/45533 718/106 |

(Continued)

FOREIGN PATENT DOCUMENTS

CN 105045667 B 11/2018

OTHER PUBLICATIONS

Xi et al. "RT-Xen: towards real-time hypervisor scheduling in xen." 2011 ACM, pp. 39-48.*

(Continued)

*Primary Examiner* — Van H Nguyen
(74) *Attorney, Agent, or Firm* — Lowenstein Sandler LLP

(57) ABSTRACT

A system enabling a hypervisor to assign processor resources for specific tasks to be performed by a virtual machine. An example method may comprise: receiving, by a hypervisor running on a host computer system, a virtual processor ("vCPU") assignment request from a virtual device driver running on a virtual machine managed by the hypervisor, assigning a vCPU for executing a task associated with the assignment request, and causing the virtual device driver to execute the task using the vCPU.

17 Claims, 6 Drawing Sheets

(56) References Cited

U.S. PATENT DOCUMENTS

2017/0337074 A1\* 11/2017 Tsirkin ................ G06F 9/45558

OTHER PUBLICATIONS

Miao et al. "FlexCore: Dynamic virtual machine scheduling using VCPU ballooning," in Tsinghua Science and Technology, vol. 20, 2015, 10 pages.\*
Kilic et al., "Overcoming Virtualization Overheads for Large-vCPU Virtual Machines", Sep. 2018, 12 pages, https://kartikgopalan.github.io/publications/kilic18overcoming.pdf.
Miao et al., "FlexCore: Dynamic Virtual Machine Scheduling Using VCPU Ballooning", Feb. 1, 2015, 10 pages, https://ieeexplore.ieee.org/stamp/stamp.jsp?arnumber=7040515.
Red Hat, Inc., "Overcommitting Virtualized Cpus", 2019, 2 pages, https://access.redhat.com/documentation/en-us/red_hat_enterprise_linux/7/html/virtualization_deployment_and_administration_guide/sect-overcommitting_with_kvm-overcommitting_virtualized_cpus.

\* cited by examiner

HYPERVISOR TASK EXECUTION MANAGEMENT FOR VIRTUAL MACHINES

TECHNICAL FIELD

The present disclosure is generally related to virtualized computer systems, and more particularly, to task execution management in virtualized computer systems.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
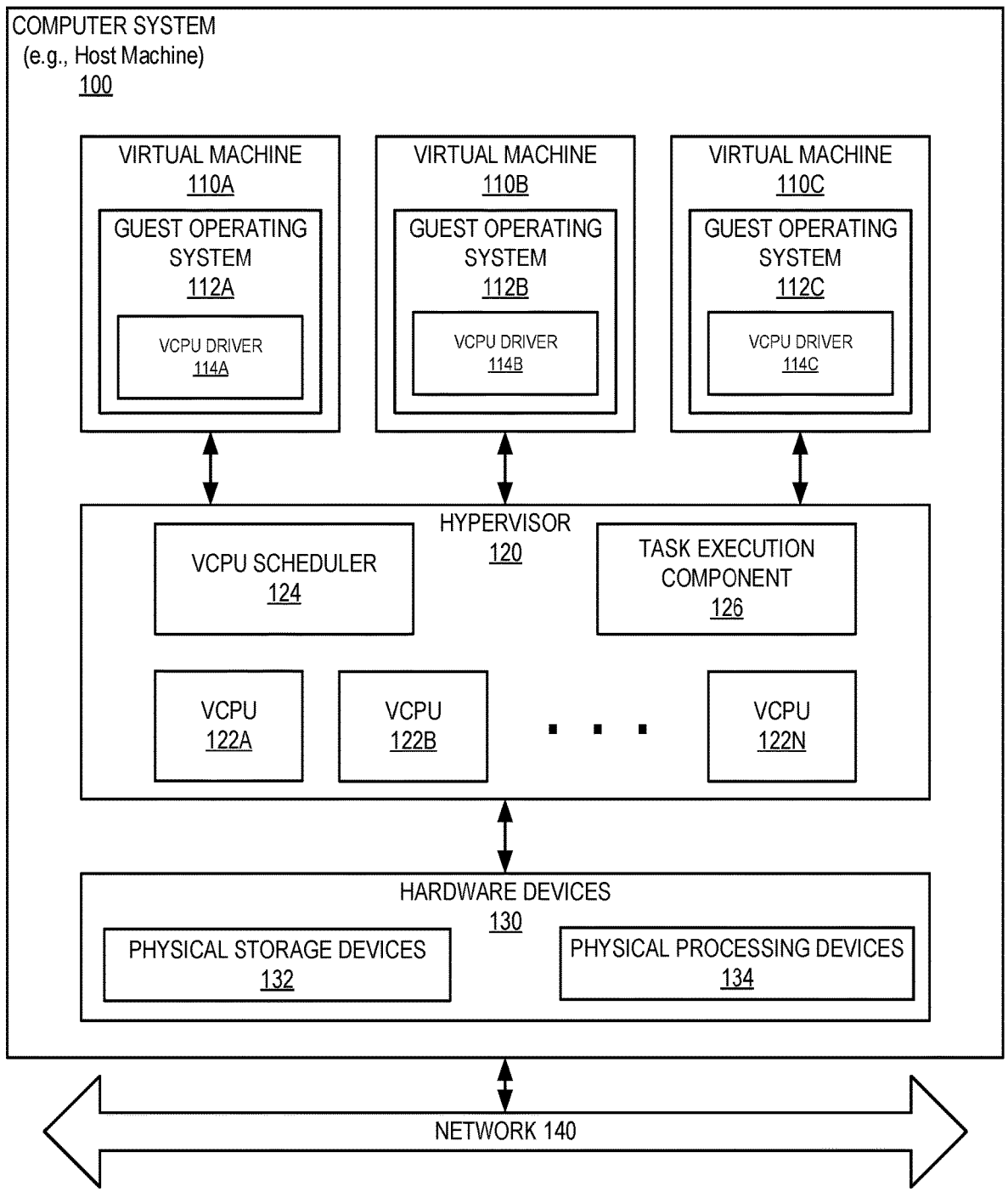
FIG. 1 depicts a high-level block diagram of an example host computer system that performs hypervisor task execution management for virtual machines, in accordance with one or more aspects of the present disclosure.

Described herein are systems and methods for hypervisor task execution management for virtual machines. A hypervisor manages execution of virtual machines on a host machine. This includes provisioning resources of a physical central processing unit ("CPU") to each virtual machine ("VM") running on the host machine. Provisioning the physical CPU resources may include associating one or more virtual central processing units ("vCPU") with each VM. A vCPU may be provisioned by a core of the physical host CPU or a number of time slots reserved from one or more cores of the physical host CPU. The vCPU may be implemented by an execution thread that is scheduled to run on a physical host CPU. This allows for vCPU overprovisioning when the number of vCPU implementing threads exceeds the number of physical processors (e.g., physical host CPUs). Software executing in the VM operates with reduced privileges such that the hypervisor retains control over resources. The hypervisor retains selective control of the processor resources, physical memory, interrupt management, and input/output ("I/O").

Recent developments in virtualization have led to an increasing amount of situations where the hypervisor needs the VM to execute one or more tasks on behalf of the hypervisor. These tasks include, for example, performing memory overcommitment with ballooning techniques (memory ballooning is a dynamic memory management technique for VMs to allow a physical host system to retrieve unused memory from certain VMs and share the unused memory with other VMs), performing networking notifications for migration of the VM, etc. In the past, the hypervisor may have performed these tasks itself, but the advent of technologies, such as encrypted VMs, make such processes challenging without VM cooperation. This may be problematic because running these tasks on the VM can cause the VM to experience latency jitters, which may negatively affect its performance. Further, the VM may experience usage spikes, such as an increase consumption and duration of allocated resources, which may lead the VM to exceed its allocated timeslot for CPU resources. In turn, the hypervisor may assume that the usage spike is due to the VM's own workload, and may charge a user of the VM for excess usage of allocated resources (e.g., additional processor cycles) and/or reduce the amount of physical resources allocated to the VM in order to compensate for the usage spike.

Aspects of the present disclosure address the above and other deficiencies by providing technology that enable a hypervisor to assign processor resources for specific tasks to be performed by a VM. In some implementations, a virtual device driver (e.g., a vCPU driver) running on a virtual machine may be utilized to request the hypervisor to assign a vCPU for executing a task on behalf of the hypervisor. A virtual device driver is a computer program that operates or controls an emulation of a hardware device by acting as a translator between the emulation of the hardware device and application(s) or operating system(s) that use it. Emulation of a hardware device may be a process of imitating the functionality of one or more hardware devices and may be provided by another hardware device (e.g., CPU), lower-level executable code (e.g., firmware), higher-level executable code (e.g., operating system), or a combination thereof. After receiving the assignment request, the hypervisor may assign a vCPU (i.e., an execution thread scheduled to run on a physical CPU) for executing the task, and cause the virtual device driver to execute the task using the assigned vCPU (e.g., by transmitting to the vCPU driver a message identifying the task to be executed). In an example, this hypervisor-assigned vCPU may run on a physical processor which is not utilized by other vCPUs of the VM. Thus, the hypervisor-assigned vCPU does not affect performance of the other vCPUs of the VM, which may decrease or prevent latency jitters and usage spikes that could otherwise be experienced by the VM when processing the task. Once the task is executed by the hypervisor-assigned vCPU, the hypervisor may pause and/or un-assign the vCPU.

The hypervisor may track the resource usage (e.g., an amount of processor cycles used). In one example, the hypervisor may limit the resource utilization by the VM based on pre-defined or dynamically-computed quotas. In another example, the hypervisor may reduce the amount of a physical resource of a certain type responsive to determining that the resource utilization exceeded a pre-defined or dynamically-computed quota. In yet another example, the resource utilization may be used as the basis for calculating the amount to be billed to the user of the VM.

Thus, assigning a separate vCPU to the VM for performing a hypervisor-assigned task would allow the hypervisor to account for the assigned vCPU separately from other processing resources allocated to the VM. Such separate accounting of the resource usage would allow the hypervisor to exclude the hypervisor-assigned vCPU usage from the resource usage incurred by the VM for the purposes of billing and/or resource allocation to the VM.

Various aspects of the above referenced methods and systems are described in details herein below by way of examples, rather than by way of limitation. The examples provided below discuss a virtualized computer system where vCPU assignment may be initiated by aspects of a hypervisor, a host operating system, a virtual machine, or a combination thereof. In other examples, the vCPU assignment may be performed in a non-virtualized computer system that is absent a hypervisor or other virtualization features discussed below.

FIG. 1 depicts an illustrative architecture of computer system 100, in accordance with an example of the present disclosure. Other architectures for computer system 100 are possible, and that the implementation of a computer system utilizing embodiments of the disclosure are not necessarily limited to the specific architecture depicted. Computer system 100 may be a single host machine or multiple host machines arranged in a heterogeneous or homogenous group (e.g., cluster) and may include one or more rack mounted servers, workstations, desktop computers, notebook computers, tablet computers, mobile phones, palm-sized computing devices, personal digital assistants (PDAs), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include one or more virtual machines 110A-C, a hypervisor 120, hardware devices 130, and a network 140.

Virtual machines 110A-C may execute guest executable code that uses an underlying emulation of physical resources. The guest executable code may include one or more guest operating systems 112A-C that manage guest applications, guest device drivers, other executable code, or a combination thereof. Each of the virtual machines 110A-C may support hardware emulation, full virtualization, para-virtualization, operating system-level virtualization, or a combination thereof. Virtual machines 110A-C may have the same or different types of guest operating systems, such as Microsoft® Windows®, Linux®, Solaris®, etc. The virtual machines 110A-C may execute guest operating systems 112A-C that manage vCPU drivers 114A-C respectively. It should be understood that vCPU drivers 114A-C are used by way of example, and that the vCPU drivers 114A-C can be any type of virtual device driver.

In an example, the vCPU driver 114A-C may be utilized for requesting the hypervisor to schedule a vCPU to execute one or more tasks on behalf of the hypervisor, such as memory overcommitment with ballooning techniques, networking notifications for migration of the VM, etc. Once hypervisor 120 schedules the vCPU to execute the one or more tasks, vCPU driver 114A-114C may report to virtual machine 110A-110C the presence of the assigned (scheduled) vCPU. Accordingly, guest operating systems 112A-C may isolate the assigned vCPU. For example, guest operating systems 112A-C may prevent execution of other tasks on the assigned vCPU. The features provided by vCPU driver 114A-C may be integrated into the operations performed by guest operating system 112A-C, respectively. The features of vCPU driver 114A-C are discussed in more detail below in regards to the computer system of FIG. 2.

Memory overcommitment with ballooning techniques may be associated with memory ballooning, which is a dynamic memory management technique for VMs to allow a host machine to retrieve unused memory from certain VMs and share the unused memory with other VMs. A balloon pseudo-device, implemented by a virtual device driver running on a VM, may inflate by allocating a specified number of guest memory pages, thus making those pages unusable by the guest OS of the VM and signaling to the hypervisor that the memory pages are available to use by the host.

Networking notifications for migration of the VM may be associated with "VM migration," which herein refers to the process of moving a running virtual machine from an origin host computer system to a destination host computer system without disrupting the guest operating system and the applications executed by the virtual machine. Before, during, and/or after the migration, the origin and/or destination hypervisor may broadcast a VM migration announcement notifying other network devices of a new address (e.g., a MAC address) associated with a virtual network interface of the VM. In certain implementations, the migration announcement may be broadcasted by the destination hypervisor before the virtual machine is restarted at the destination host, to ensure uninterrupted network communications by the virtual machine after it has been restarted. Responsive to receiving the announcement, one or more data link layer devices (such as Ethernet switches and/or bridges) may associate the data link layer address and the switch port through which the announcement has been received. Hypervisor 120 (also referred to as a virtual machine monitor ("VMM")) may provide virtual machines 110A-C with access to one or more features of the underlying hardware devices 130. In the example shown, hypervisor 120 may run directly on the hardware of computing device 100 (e.g., bare metal hypervisor). In other examples, hypervisor 120 may run on or within a host operating system (not shown). Hypervisor 120 may manage system resources, including access to hardware devices 130. In the example shown, hypervisor 120 may include virtual central processing unit ("vCPU") 122A-122N, where N is a positive integer.

The vCPUs 122A-122n may be used by guest operating systems 112A-112C to handle execution of application threads, guest OS functions, and tasks. An application thread may be a sequence of programmed instructions that can be managed by guest operating systems 112A-112C. Each vCPU 122A-122N may be an execution thread scheduled to run on a physical CPU associated with physical processing devices 134. In an example, hypervisor 120 manages mappings between vCPUs 122A-122N and the CPUs associated with the physical processing devices 134 in a transparent fashion, so that guest operating systems 112A-112C and applications, functions, or tasks executing on virtual machines 110A-110C, respectively, interact with vCPUs 122A-122N as though they were actual physical processors.

vCPU scheduler 124 schedules application threads, guest OS functions, and tasks for execution on one or more vCPU 122A-122N. vCPU scheduler 124 may further receive requests from virtual machine 110A-110C for assignment of one or more vCPUs 122A-122N. Task execution component 126 provides instruction to virtual machine 110A-110C to execute applications, functions, and tasks on one or more assigned vCPUs 122A-122N. The features of vCPU scheduler 124 and task execution component 126 may be incorporated into a single component. vCPU scheduler 124 and task execution component 126 will be discussed in further detail below.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks discussed above in regards to vCPUs 122A-122N. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network ("LAN"), a wide area network ("WAN")), or a combination thereof. In one example, network 140 may include a wired or a wireless infrastructure, which may be provided by one or more wireless communications systems, such as a wireless fidelity ("WiFi") hotspot connected with the network 140 and/or a wireless carrier system that can be implemented using various data processing equipment, communication towers, etc.

Figure 2:
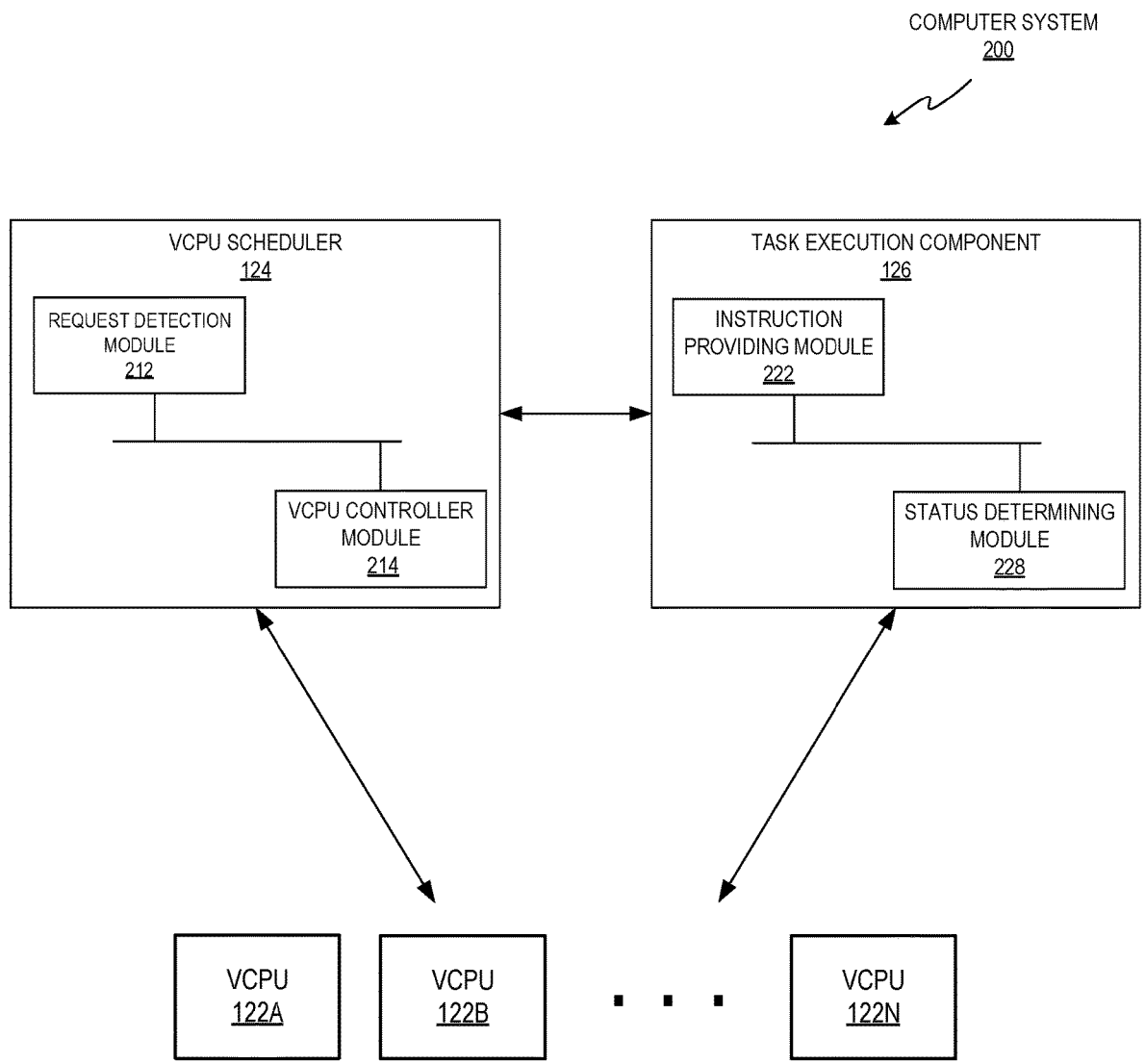
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include the vCPU scheduler 124, the task execution component 126, and vCPU 122A-122N. By way of example, the computer system 200 will be discussed in relation with virtual machine 110A.

vCPU scheduler 124 may enable computer system 200 to schedule application threads, guest OS functions, and tasks for execution on one or more vCPU 122A-122N. As illustrated, vCPU scheduler 124 may include a request detection module 212 and a vCPU controller module 214. Request detection module 212 may receive a request for a vCPU from virtual machine 110A. The request may identify a task to be executed by virtual machine 110A using a vCPU. Request detection module 212 may further report the task to a host administrator, which may be useful for, among other purposes, debugging.

vCPU controller module 214 may determine a status of vCPUs 122A-122N, and assign one or more vCPUs 122A-122N to virtual machine 110A. For example, vCPU controller module 214 may create an execution thread to implement one or more vCPUs 122A-122N. The vCPU controller module 214 may then schedule the execution thread to run on physical processing devices 134 (e.g., on one or more physical processors).

vCPU controller module 214 may further track resource usage (e.g., an amount of processor cycles used) and account the assigned vCPU(s) separately from processing resources allocated (e.g., vCPU(s)) to virtual machine 110A. In one example, the vCPU controller module 214 may limit the resource utilization by the VM based on pre-defined or dynamically-computed quotas. In another example, the vCPU controller module 214 may reduce the amount of a physical resource of a certain type responsive to determining that the resource utilization exceeded a pre-defined or dynamically-computed quota. In yet another example, the resource utilization may be used as the basis for calculating the amount to be billed to a user of virtual machine 110A. The vCPU controller module 214 may account for the assigned vCPU separately from the processing resources allocated to virtual machine 110A. Such separate accounting of the resource usage would allow the vCPU controller module 214 to exclude hypervisor-assigned vCPU usage from the resource usage incurred by the virtual machine 110A (e.g., exclude utilization of the vCPU from a resource utilization report) for the purposes of billing and/or resource allocation to the virtual machine 110A.

Task execution component 126 may provide instructions to virtual machine 110A to execute the task on the assigned vCPU (e.g., vCPU 122B). For example, instruction providing module 222 may enable hypervisor 120 or a host operating system to instruct virtual machine 110A to perform an action. In traditional virtualization architectures, a virtual machine provides instructions to the hypervisor to initiate operations (e.g., hypercalls), but instruction providing module 222 may provide a complimentary service that enables hypervisor 120 to provide instructions to virtual machine 110A to cause virtual machine 100A to perform an operation (e.g., execute the task). This may enable the operation to occur with the privileges and access available to virtual machine 110A as opposed to privileges and access of hypervisor 120.

Instruction providing module 222 may provide the instructions to the virtual machine (e.g., the vCPU driver) using a variety of different mechanisms, or may use a mechanism to indicate to the vCPU driver the vCPU assigned or scheduled to perform the task. The mechanisms may involve the use of a hardware generated messages (e.g., hardware signals) in the form of interrupts, traps, notifications, exceptions, faults, other signals, or a combination thereof. In an example, instruction providing module 222 may transmit a message into the assigned vCPU and may cause virtual machine 110A to perform the action. The executable code necessary to perform the operation may exist within the virtual machine 110A or may be embedded within a portion of virtual machine 110A before, during, or after the message (e.g., interrupt or exception) is generated. For example, the executable code necessary to perform the operation may exist in vCPU driver 114A of virtual machine 110A. After being assigned the vCPU, the vCPU driver 114A may report to the virtual machine 110A the presence of the assigned vCPU. Accordingly, guest operating system 112A may isolate the assigned vCPU. For example, guest operating system 112A would not be able to use the assigned vCPU for execution of tasks other than the task(s) assigned by the hypervisor for execution by the VM.

Status determining module 224 may determine a status of the task being executed on the assigned vCPU. The mechanisms may involve the use of a clock or timer preset with a time required to execute the task, hardware generated messages requesting virtual machine 110A to indicate a current status of the task, other signals, or a combination thereof. Status determining module 224 may also un-assign or pause the assigned vCPU from virtual machine 110A based on the status of the task. For example, status determining module 224 may un-assign or pause the assigned vCPU from virtual machine 110A when the virtual machine 110A has completed the task, when the task is no longer needed, when a configuration of hypervisor 120 changes, etc.

Figure 3:
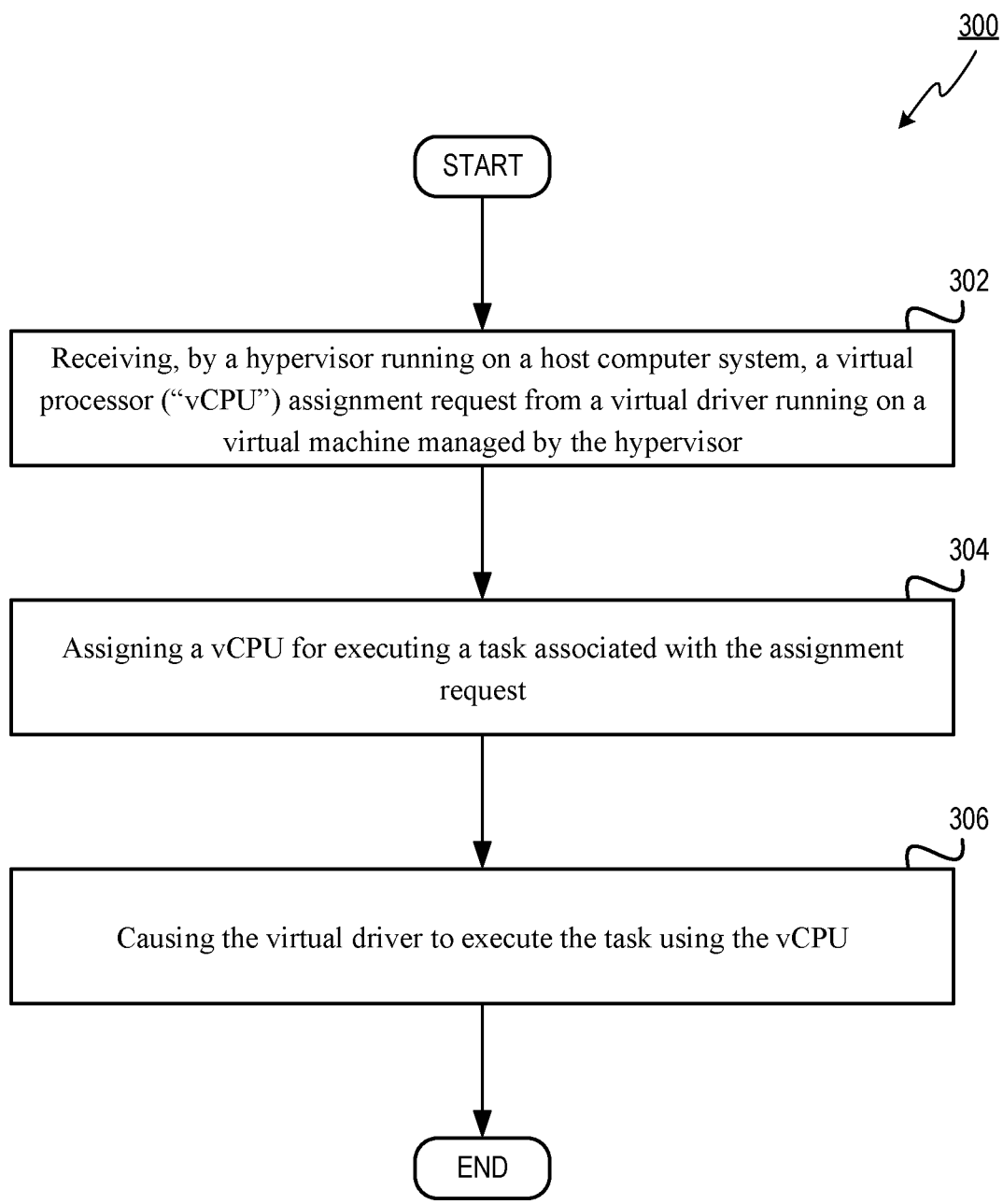
FIG. 3 depicts a flow diagram of an example method for task execution management, in accordance with one or more aspects of the present disclosure.

FIG. 3 depicts a flow diagram of an illustrative example of a method 300 for task execution management, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, the hypervisor running on a host computer system may receive a vCPU processor assignment request from a virtual device driver running on a virtual machine managed by the hypervisor. The assignment request may identify a task to be executed by the virtual machine. The task may include performing memory overcommitment with ballooning techniques, performing networking notifications for migration of the virtual machine, or other tasks that the virtual machine desires to execute.

At block 304, the hypervisor may assign a vCPU for executing the task associated with the assignment request. For example, the hypervisor may schedule one or more vCPUs for executing the task. The hypervisor may account for the assigned vCPU separately from other processing resources allocated to the virtual machine. Such separate accounting of the resource usage would allow the hypervisor to exclude hypervisor-assigned vCPU usage from the resource usage incurred by the VM for the purposes of billing and/or resource allocation to the VM.

At block 306, the hypervisor may cause the virtual device driver to execute the task using the vCPU. For example, the hypervisor may cause the virtual device driver to execute the task by providing instructions to the virtual device driver using a variety of different mechanisms, or may use a mechanism to indicate to the virtual device driver the vCPU assigned or scheduled to perform the task. The mechanisms may involve the use of a hardware generated messages in the form of interrupts, traps, notifications, exceptions, faults, other signals, or a combination thereof. For example, the hypervisor may transmit a message into the assigned vCPU to cause virtual machine to perform the action. The executable code necessary to perform the operation may exist within the virtual machine or may be embedded within a portion of virtual machine before, during, or after the message (e.g., interrupt or exception) is generated. For example, the executable code necessary to perform the operation may exist in the virtual device driver of the virtual machine. Responsive to completing the operations described herein above with references to block 306, the method may terminate.

Figure 4:
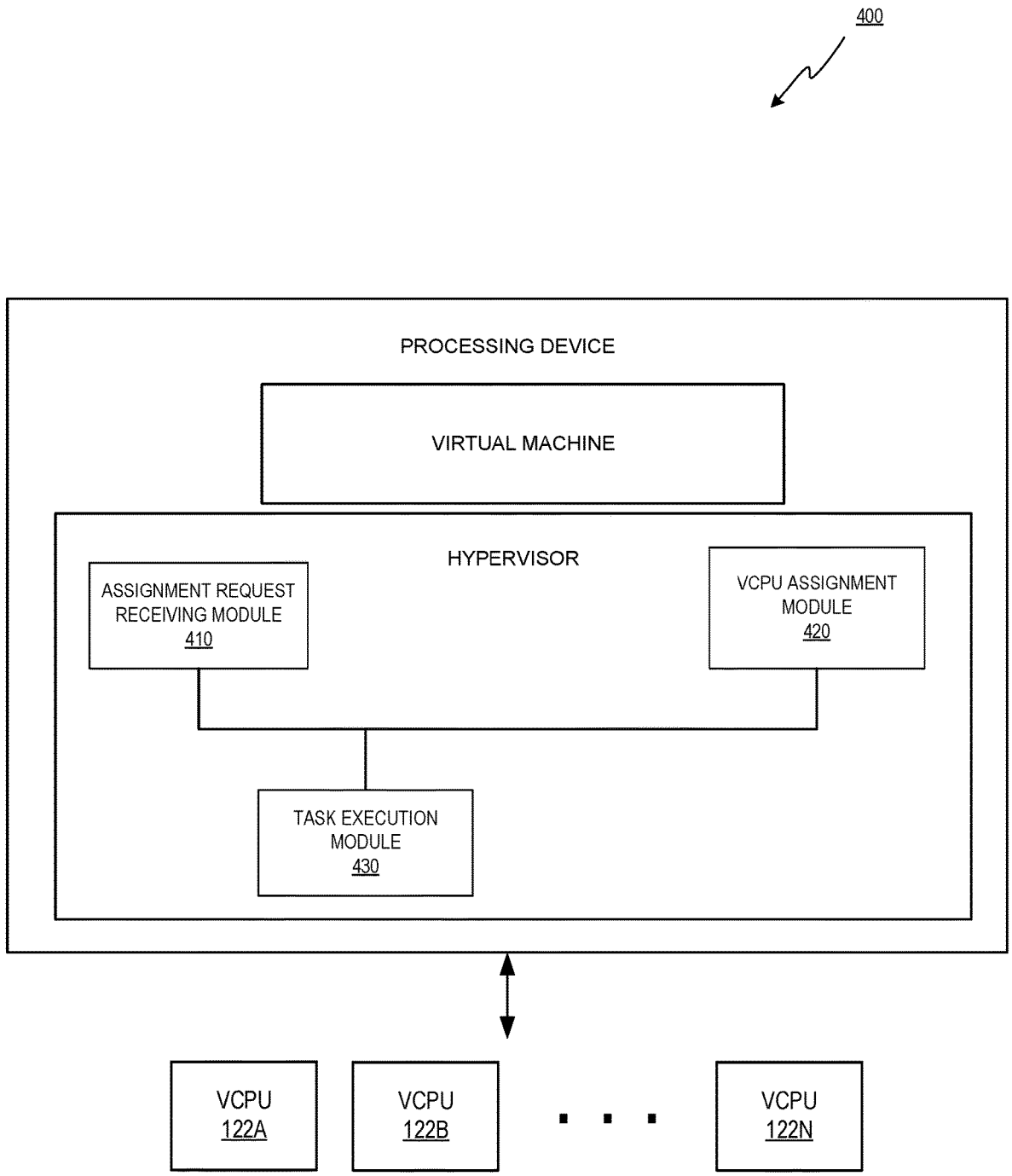
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computing device 100 and may include one or more processing devices and one or more memory devices. In the example shown, computer system 400 may include an assignment request receiving module 410, vCPU assignment module 420, and a task execution module 430.

Assignment request module 410 may enable the hypervisor to receive a vCPU assignment request from a virtual device driver running on a virtual machine managed by the hypervisor. The assignment request may identify a task to be executed by the virtual machine. The task may include performing memory overcommitment with ballooning techniques, performing networking notifications for migration of the virtual machine, or other tasks that the virtual machine desires to execute.

vCPU assignment module 420 may enable the hypervisor to assign a vCPU for executing the task associated with the assignment request. For example, the vCPU assignment module 420 may schedule one or more vCPUs for executing the task. The hypervisor may account for the assigned vCPU separately from other processing resources allocated to the virtual machine. Such separate accounting of the resource usage would allow the hypervisor to exclude hypervisor-assigned vCPU usage from the resource usage incurred by the VM for the purposes of billing and/or resource allocation to the VM.

Task execution module 430 may cause the virtual device driver to execute the task using the vCPU. For example, the task execution module 430 may cause the virtual device driver to execute the task by providing instructions to the virtual device driver using a variety of different mechanisms, or may use a mechanism to indicate to the virtual device driver the vCPU assigned or scheduled to perform the task. The mechanisms may involve the use of a hardware generated messages in the form of interrupts, traps, notifications, exceptions, faults, other signals, or a combination thereof. For example, the task execution module may cause the hypervisor to transmit a message into the assigned vCPU to cause virtual machine to perform the action. The executable code necessary to perform the operation may exist within the virtual machine or may be embedded within a portion of virtual machine before, during, or after the message (e.g., interrupt or exception) is generated. For example, the executable code necessary to perform the operation may exist in the virtual device driver of the virtual machine.

Figure 5:
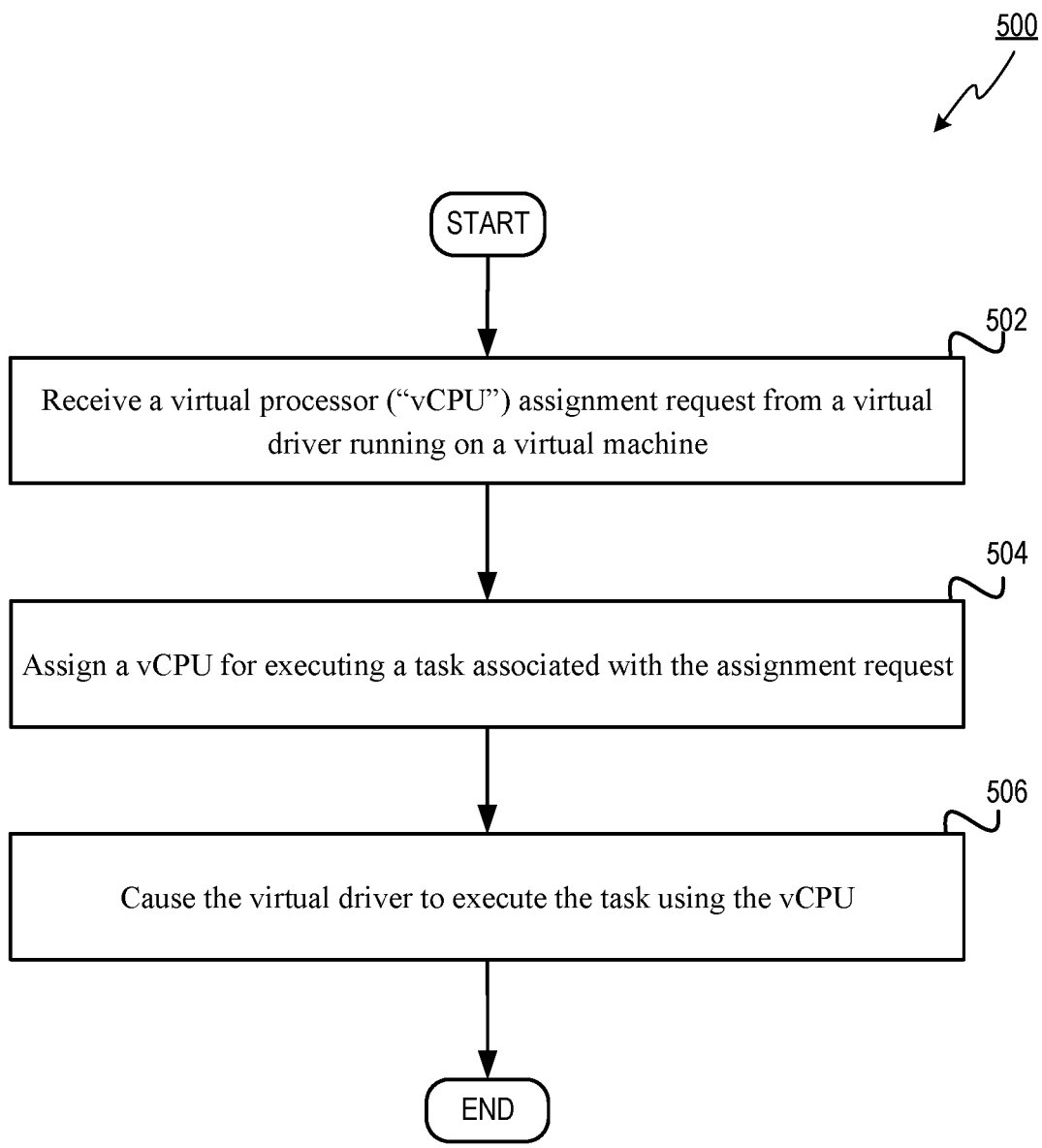
FIG. 5 depicts a flow diagram of an example method for hypervisor task execution management for virtual machines, in accordance with one or more aspects of the present disclosure.

FIG. 5 depicts a flow diagram of one illustrative example of a method 500 for task execution management, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, the processing device may receive a vCPU processor assignment request from a virtual device driver running on a virtual machine managed by a hypervisor. The assignment request may identify a task to be executed by the virtual machine. The task may include performing memory overcommitment with ballooning techniques, performing networking notifications for migration of the virtual machine, or other tasks that the virtual machine desires to execute.

At block 504, the processing device may assign a vCPU for executing the task associated with the assignment request. For example, the processing device may schedule one or more vCPUs for executing the task. A hypervisor may account for the assigned vCPU separately from other processing resources allocated to the virtual machine. Such separate accounting of the resource usage would allow the hypervisor to exclude hypervisor-assigned vCPU usage from the resource usage incurred by the VM for the purposes of billing and/or resource allocation to the VM.

At block 506, the processing device may cause the virtual device driver to execute the task using the vCPU. For example, the processing device may cause the virtual device driver to execute the task by providing instructions to the virtual device driver using a variety of different mechanisms, or may use a mechanism to indicate to the virtual device driver the vCPU assigned or scheduled to perform the task. The mechanisms may involve the use of a hardware generated messages in the form of interrupts, traps, notifications, exceptions, faults, other signals, or a combination thereof. For example, the hypervisor may transmit a message into the assigned vCPU to cause virtual machine to perform the action. The executable code necessary to perform the operation may exist within the virtual machine or may be embedded within a portion of virtual machine before, during, or after the message (e.g., interrupt or exception) is generated. For example, the executable code necessary to perform the operation may exist in the virtual device driver of the virtual machine. Responsive to completing the operations described herein above with references to block 506, the method may terminate.

Figure 6:
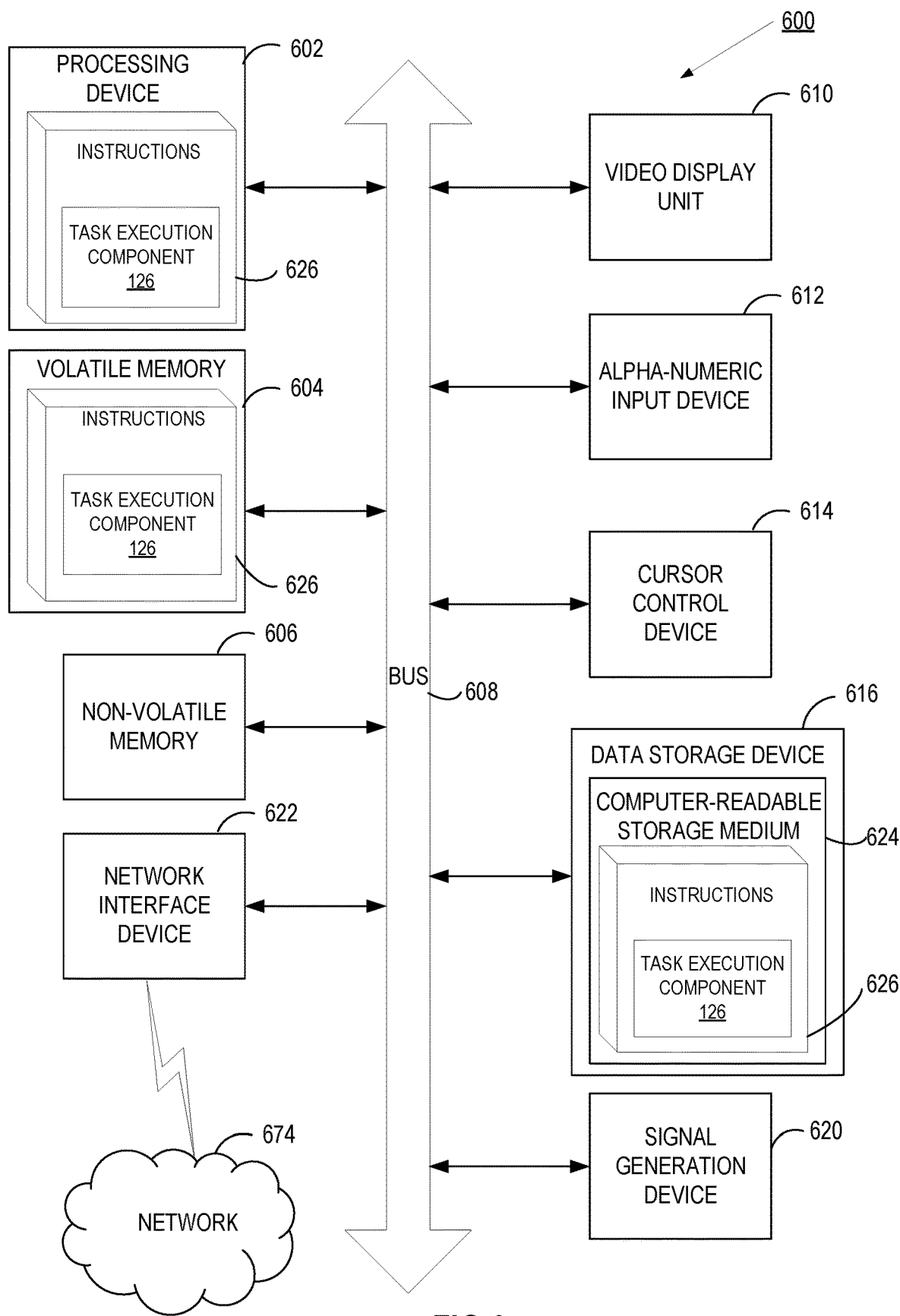
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 or 500 and for task execution component 126 (not shown), vCPU scheduler component 124, and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    tracking, by a hypervisor running on a host computer system, resource usage by a virtual machine managed by the hypervisor;
    receiving, by the hypervisor, a virtual processor ("vCPU") assignment request from a virtual device driver running on the virtual machine;
    assigning a vCPU for executing a task associated with the vCPU assignment request;
    creating an execution thread implementing the vCPU;
    scheduling the execution thread to run on a physical CPU of the host computer system;
    causing the virtual device driver to execute the task using the vCPU; and
    excluding utilization of the vCPU from the resource usage tracked by the hypervisor.

2. The method of claim 1, wherein the vCPU assignment request identifies the task to be executed by the virtual machine.

3. The method of claim 1, wherein the task comprises at least one of: a memory ballooning task or a migration notification task.

4. The method of claim 1, further comprising: un-assigning the vCPU from the virtual machine.

5. The method of claim 1, wherein the virtual device driver is a vCPU driver.

6. The method of claim 1, further comprising: excluding utilization of the vCPU from a resource utilization report for the virtual machine.

7. The method of claim 1, further comprising:
    causing the virtual device driver to report a presence of the vCPU to the virtual machine.

8. A system, comprising:
    a memory;
    a processing device operatively coupled to the memory, the processing device configured to:
    track resource usage by a virtual machine managed by a hypervisor running on a host computer system;

receive a virtual processor ("vCPU") assignment request from a virtual device driver running on the virtual machine;
assign a vCPU for executing a task associated with the assignment;
request by creating an execution thread implementing the vCPU;
schedule the execution thread to run on a physical CPU of the host computer system;
cause the virtual device driver to execute the task using the vCPU; and
exclude utilization of the vCPU from the resource usage tracked by the hypervisor.

9. The system of claim 8, wherein the assignment request identifies the task to be executed by the virtual machine.

10. The system of claim 8, wherein the task comprises at least one of: a memory ballooning task or a migration notification task.

11. The system of claim 8, wherein the processing device is further configured to un-assign the vCPU from the virtual machine.

12. The system of claim 8, wherein the virtual device driver is a vCPU driver.

13. The system of claim 8, wherein the processing device is further configured to: exclude utilization of the vCPU from a resource utilization report for the virtual machine.

14. A non-transitory machine-readable storage medium storing instructions that cause a processing device to:
track resource usage by a virtual machine managed by a hypervisor running on a host computer system;
receive a virtual processor ("vCPU") assignment request from a virtual device driver running on the virtual machine;
assign a vCPU for executing a task associated with the assignment request;
create an execution thread implementing the vCPU;
scheduling the execution thread to run on a physical CPU of the host computer system;
cause the virtual device driver to execute the task using the vCPU; and
excluding utilization of the vCPU from the resource usage tracked by the hypervisor.

15. The non-transitory machine-readable storage medium of claim 14, wherein the assignment request identifies the task to be executed by the virtual machine.

16. The non-transitory machine-readable storage medium of claim 14, wherein the task comprises at least one of: a memory ballooning task or a migration notification task.

17. The non-transitory machine-readable storage medium of claim 14, further causing the processing device to un-assign the vCPU from the virtual machine.

* * * * *